US007598640B2

(12) United States Patent
Heichel et al.

(10) Patent No.: US 7,598,640 B2
(45) Date of Patent: Oct. 6, 2009

(54) VIBRATION EXCITER

(75) Inventors: Christian Heichel, Niedernberg (DE); Albrecht Kleibl, Grosshennersdorf (DE); Frank Hense, Gevelsberg (DE); Rolf Winzen, Bochum (DE)

(73) Assignee: ABI Anlagentechnik-Baumaschinen-Industriebedarf Maschinenfabrik und Vertriebsgesellschaft mbH, Niedernberg (DE)

( * ) Notice: Subject to any disclaimer, the term of this patent is extended or adjusted under 35 U.S.C. 154(b) by 0 days.

(21) Appl. No.: 11/985,546

(22) Filed: Nov. 15, 2007

(65) Prior Publication Data

US 2008/0218013 A1 Sep. 11, 2008

(30) Foreign Application Priority Data

Mar. 7, 2007 (DE) .................. 20 2007 005 283 U

(51) Int. Cl.
*H02K 7/06* (2006.01)

(52) U.S. Cl. .......................................... 310/81; 310/77

(58) Field of Classification Search .................. 310/81, 310/76, 77, 92, 93

See application file for complete search history.

(56) References Cited

U.S. PATENT DOCUMENTS

| | | | | |
|---|---|---|---|---|
| 2,701,036 A * | 2/1955 | Osborne | ..................... | 188/171 |
| 4,096,404 A * | 6/1978 | Sukhanov et al. | ......... | 310/67 R |
| 5,177,386 A * | 1/1993 | Shimada | ...................... | 310/81 |
| 6,177,744 B1 * | 1/2001 | Subler et al. | .................. | 310/90 |
| 6,242,831 B1 * | 6/2001 | Khan | .......................... | 310/90 |

* cited by examiner

*Primary Examiner*—Dang D Le
(74) *Attorney, Agent, or Firm*—Collard & Roe, P.C.

(57) ABSTRACT

A vibration exciter has at least two axles disposed parallel to one another, as well as at least two imbalance masses, which are attached to one or more of the axles. The relative rotary position of the imbalance masses can be adjusted relative to one another by a rotary oscillating motor having a rotor shaft and a stator housing. The rotor shaft is an integral part of one of the axles, and the rotary position of the stator housing relative to the rotor shaft can be changed. The stator housing can be locked to the rotor shaft. The oscillating motor has a rotor shaft and a stator housing, between which working chambers are formed. The stator housing can rotate about the rotor shaft and can be locked relative to the rotor shaft.

15 Claims, 7 Drawing Sheets

613
62
VI
621
630
616
614
VII
61

63
65
612
VI

VIBRATION EXCITER

BACKGROUND OF THE INVENTION

1. Field of the Invention

The invention relates to a vibration exciter. The invention furthermore relates to an oscillating motor for use in a vibration exciter.

2. The Prior Art

In construction, vibration generators such as vibrators, shakers, or vibratory pile drivers are used to introduce or draw profiles into the ground, or also to compact soil material. The ground is excited by vibration, and thereby achieves a "pseudo-fluid" state. The goods to be driven in can then be pressed into the construction ground by a static top load. The vibration is characterized by a linear movement and is generated by rotating imbalances that run in opposite directions, in pairs, within a vibrator gear mechanism. Vibration generators characterized by the imbalance that is installed (referred to as "static moment" in technical circles) and by the maximal speed of rotation.

In order to achieve an optimal advance and good compacting, as a function of the goods to be driven in and of the soil properties, it is desirable to regulate the amplitude, frequency, or force direction of the vibration generator. It is practical if the adjustment of the vibration takes place by way of a change in the static moment or the phase position of the imbalances. When the vibration exciter is started up, the inherent frequency range of the soil is passed through. If the soil is excited in the resonance range, the amplitude of the soil vibration becomes very great, and this can result in damage to adjacent buildings. Therefore it is necessary that no imbalances are in effect when the vibration exciter is started up.

Known solutions such as planetary gear mechanisms or oscillating gear trains require a lot of space, are not well suited for high speeds of rotation, and produce a high noise level because of additional gear wheels.

SUMMARY OF THE INVENTION

This is where the invention provides a remedy. It is an object of the invention to provide a vibration exciter in which the effective imbalance, and therefore the vibration, is adjustable, and which furthermore has a compact construction. According to the invention, this task is accomplished by a vibration exciter comprising at least two axles disposed parallel to one another, as well as at least two imbalance masses, which are attached to one or more of the axles. There are means for adjusting the relative rotary position of the imbalance masses relative to one another. These means comprise at least one rotary oscillating motor having a rotor shaft and a stator housing. The rotor shaft is an integral part of one of the axles, and the rotary position of the stator housing relative to the rotor shaft can be changed. The rotor oscillating motor has means for locking the stator housing to the rotor shaft.

With the invention, a vibration exciter is created in which the effective imbalance, and therefore the vibration, is adjustable, and which furthermore has a compact construction. The use of the rotor oscillating motor allows a relative adjustment of the imbalance masses relative to one another, without any conversion of a linear movement into a rotary movement being required, thereby achieving a compact construction. A position change due to internal leakage is prevented by the means for locking the stator housing onto the rotor shaft. Since the hydraulic pressure can be lowered in the locked state of the stator housing, seals are under clearly less stress, and this results in a reduced wear of the seals, since the press-down forces are clearly less in the pressure-free state. This saves energy, since no adjustment or re-adjustment of the oscillating motor is required over the period of operation of the vibrator. Furthermore, the required regulation of the oscillating motor is simplified.

In an embodiment of the invention, at least one shaft seal is disposed between rotor shaft and stator housing, which seal is provided with a support element. In this way, external leaks at the shaft seals are avoided in an operating state with low operating pressure. Lifting of the sealing edge of the shaft seal, at high speeds of rotation or vibrations, is mechanically prevented by the support element. Preferably, the shaft seal is hydraulically biased.

In another embodiment of the invention, the stator housing has at least one closure lid that is at least partially unreleasably cast-filled with a slide alloy, for radial and axial bearing of the stator housing with regard to the rotor shaft. In this way, a thin-walled coating is achieved, which is vibration-resistant as compared to slide bearings that are pressed in, which tend to come loose under strong vibrations. Alternatively, the rotor shaft can be at least partially unreleasably cast-surrounded with a slide alloy, in order to achieve this advantage. It is advantageous if the slide alloy is a lead/bronze alloy.

In a further development of the invention, the stator vane of the stator housing is formed onto the side of the gear wheel that faces the rotor shaft. In this way, more effective utilization of the construction space is achieved. Furthermore, the torque of the oscillation motor can be increased, taking advantage of the gear wheel body, while keeping the axle distance the same. A vibration-stressed parting point is avoided; the number of individual parts is reduced.

In an advantageous embodiment, the means for locking the stator housing to the rotor shaft can be hydraulically activated. In this way, the braking system can be connected to the existing hydraulics.

Preferably, the means for locking the stator housing to the rotor shaft is formed by a spring-pressure multiple-disk brake. Such multiple-disk brakes require only a small construction space.

The invention also relates to an oscillating motor for use in a vibration exciter, which allows a constant setting of the imbalances, with simultaneous stress relief of the hydraulic system, in working operation of the vibration exciter. The oscillating motor comprises a rotor shaft and a stator housing, between which working chambers are formed. The stator housing can rotate about the rotor axle, and means for locking the stator housing relative to the rotor shaft are provided.

With the invention, an oscillating motor for use in a vibration exciter is created, which makes a constant setting of the imbalances, with simultaneous stress relief of the hydraulic system, possible in working operation of the vibration exciter.

It is advantageous if the means for locking can be hydraulically activated. In this way, it is possible to connect the braking system to the existing hydraulics. Preferably, the means for locking is formed by a spring-pressure multiple-disk brake. In this way, compact construction is made possible.

In a further development of the invention, at least one shaft seal is disposed between the rotor shaft and stator housing, which seal is provided with a support element. In this way, external leaks at the shaft seals are avoided in an operating state with low operating pressure. Lifting of the sealing edge of the shaft seal, at high speeds of rotation or vibrations, is mechanically prevented by means of the support element.

In an embodiment of the invention, a gear wheel is disposed on the stator housing, which is configured, on its inside that faces the rotor shaft, as a stator having a stator vane. In this way, effective utilization of the construction space is brought about. Furthermore, the torque of the oscillating motor can be increased, utilizing the gear wheel body, while keeping the axle distance the same. A parting point that might be subject to vibration stress is avoided, and the number of individual parts is reduced.

In another embodiment of the invention, the stator housing has at least one closure lid that is at least partially unreleasably cast-filled with a slide alloy, for radial and axial bearing of the stator housing with regard to the rotor shaft. In this way, a thin-walled coating is achieved, which is vibration-resistant as compared to slide bearings that are pressed in, which tend to come loose under strong vibrations. Furthermore, the thin-walled coating is suitable for absorbing the stresses that result from shaft bending and mass forces, because of the great strength of the base material, with simultaneously good slide properties. The processability of the bearing point allows a very slight bearing play as compared to bearings to be pressed in, and this in turn guarantees a slight relative movement between shaft with rotor and housing with stator. Lower mass forces that are in effect between shaft with rotor and housing with stator result from the low bearing play. Alternatively, the rotor shaft can be at least partially unreleasably cast-surrounded with a slide alloy, in order to achieve this advantage.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
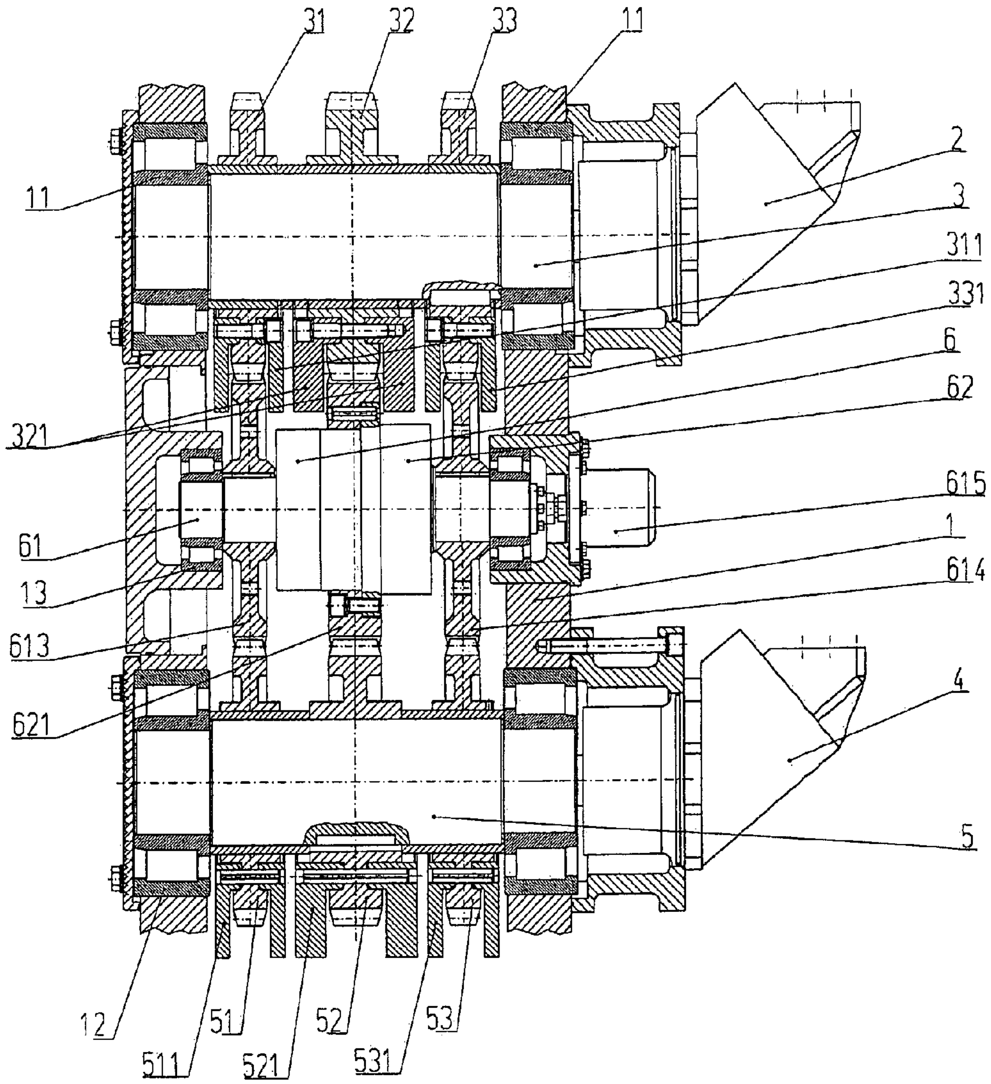
FIG. 1 shows a representation of a vibrator gear mechanism in longitudinal section.

Referring now in detail to the drawings, the vibration generator selected as an exemplary embodiment is configured as a vibrator gear mechanism, as shown in FIG. 1. It essentially consists of a housing 1 in which two shafts 3, 5 provided with gear wheels 31, 32, 33 and 51, 52, 53, respectively, are mounted to rotate, as well as of an oscillating motor 6, the rotor shaft 61 of which is provided with gear wheels 613, 614, and the stator housing 62 of which is provided with a gear wheel 621.

Shaft 3 is mounted to rotate in bearings 11 of housing 1. An outer gear wheel 31 is disposed on shaft 3, mounted to rotate; and opposite outer gear wheel 33 is connected to rotate with shaft 3. Gear wheels 31, 33 are provided with imbalance masses 311, 331, in each instance. In the center between gear wheels 31, 33, a gear wheel 32 is furthermore disposed on shaft 3, mounted to rotate. Gear wheel 32 is also provided with an imbalance mass 321. In the exemplary embodiment, shaft 3 is connected with a drive 2. Opposite shaft 3, a shaft 5 is furthermore mounted in housing 1, so as to rotate, by means of bearings 12. Shaft 5 is provided, in the same manner as shaft 3, with three gear wheels 51, 52, 53, on which imbalance masses 511, 521, 531 are attached. On shaft 5, however, in contrast to shaft 3, outer gear wheels 51, 53 are connected with shaft 5 so that they can rotate; gear wheel 52 disposed between gear wheels 51, 53 is attached to shaft 5 in fixed manner, so as to rotate with it. In the exemplary embodiment, shaft 5 is connected with a drive 4.

A shaft 61 is mounted in housing 1, so as to rotate, between shafts 3, 5, by way of bearings 13. Shaft 61 is essentially the rotor shaft of an oscillating motor 6 that is disposed centered on it. On both sides of oscillating motor 6, gear wheels 613, 614 are disposed on shaft 61, in fixed manner, so as to rotate with it. Gear wheels 613, 614 are positioned on shaft 61 in such a manner that they are in engagement with gear wheels 31, 51 and 33, 53, respectively, of shafts 3, 5. Furthermore, a gear wheel 621 is disposed on stator housing 62 of oscillating motor 6, fixed in place, so as to rotate with it. Gear wheel 621 is positioned on stator housing 62 in such a manner that it stands in engagement with gear wheels 32, 52 of shafts 3, 5. Shaft 61 is furthermore connected with a rotary passage 615 that projects out of housing 1.

Figure 6:
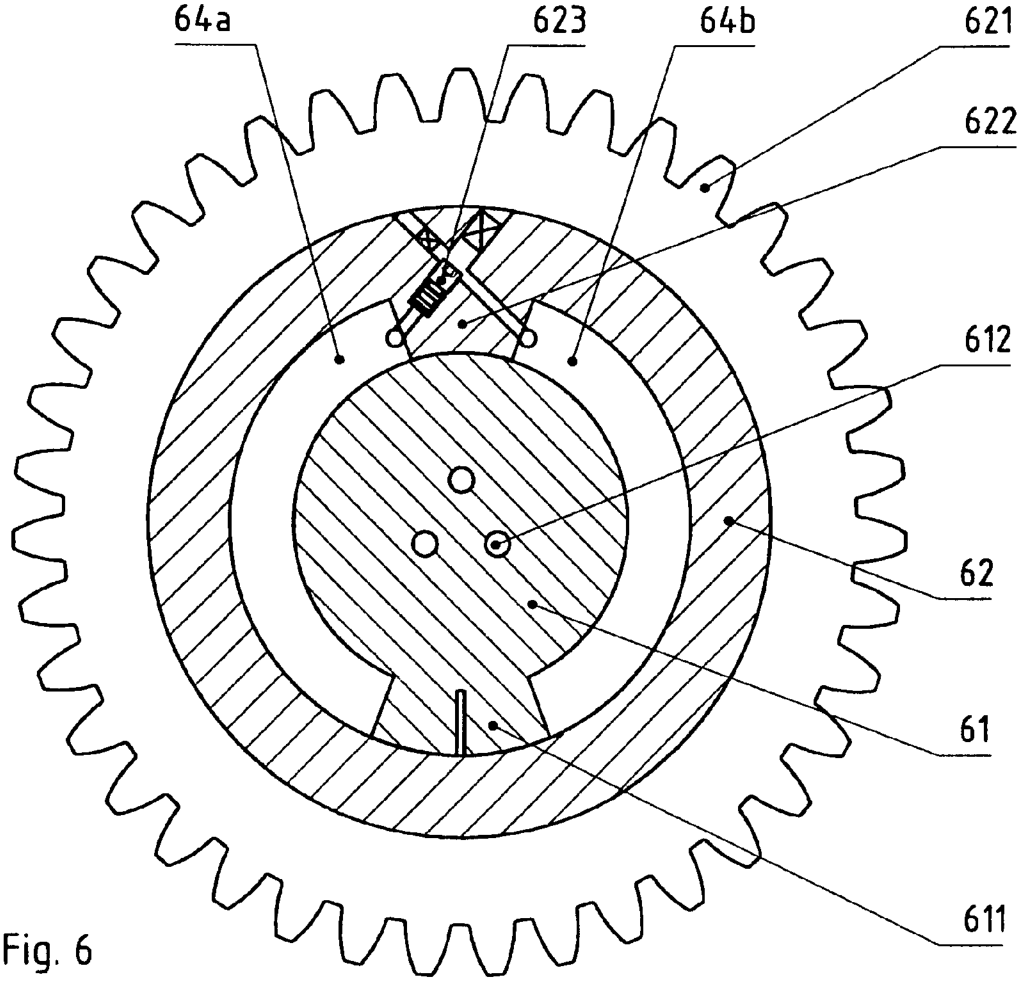
FIG. 6 shows the representation of the oscillating motor from FIG. 5 in cross-section along the line VI-VI.
Figure 7:
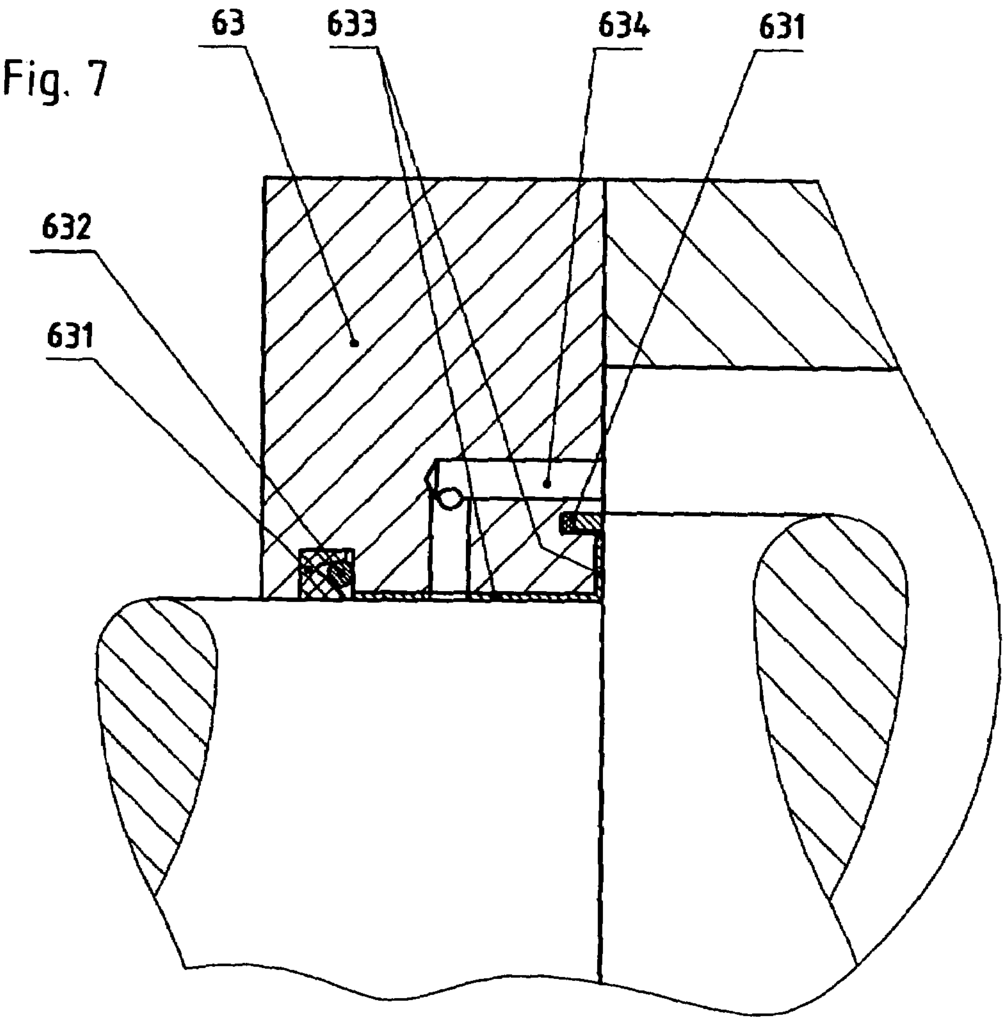
FIG. 7 shows the detail view of the cut-out VII from FIG. 5.

Oscillating motor 6 is essentially formed by rotor shaft 61 and a stator housing 62 that surrounds the latter, as well as by two closure lids 63 that are disposed on both sides of the stator housing. An intermediate space is formed between rotor shaft 61 and stator housing 62, which space is divided by means of a rotor vane 611 formed onto rotor shaft 61 and by a stator vane 622 formed onto stator housing 62, so that two working chambers 64*a*, 64*b* are formed. In the exemplary embodiment, stator vane 622 is formed directly onto the inside of gear wheel 621, so that stator housing 62 is formed in one piece with gear wheel 621 and stator vane 622. To implement a pressure-dependent bias force of inner seals 631 of the oscillating motor 6, an alternating valve 623 is disposed in the stator vane 622, the control channels of which open into working chambers 64*a*, 64*b* on the two sides of the stator vane (cf. FIG. 6). Furthermore, channels 612 for supplying media to the two working chambers and to multiple-disk brake 65, by means of the hydraulic system, are worked in along shaft 61.

Figure 5:
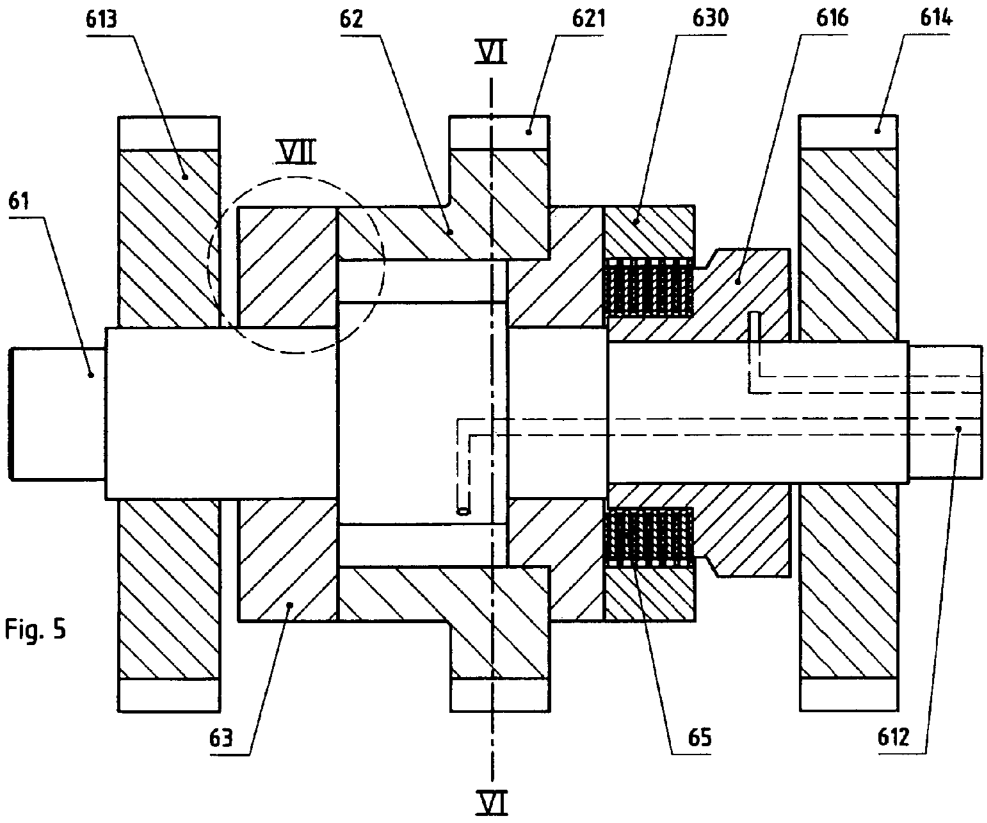
FIG. 5 shows the representation of a rotor oscillating motor having a spring-pressure multiple-disk brake, in longitudinal section.

In the embodiment according to FIG. 5, the oscillating motor is provided with a multiple-disk brake 65. Multiple-disk brake 65 consists of a housing 630 attached to lid 63 of stator housing 62, a hub 616 attached to shaft 61, and a clutch disk package 65. When the clutch disks that mesh with housing 630 are mechanically pressed against the clutch disks that mesh with the hub connected with the rotor shaft 61, by means of spring force (or alternatively, hydraulically), locking of stator housing 62 to rotor shaft 61 is brought about.

Stator housing 62 is sealed with regard to rotor shaft 61 by means of seals 631. Seals 631 are mechanically biased with elastic elements, and are additionally pressed, with pressure, against the corresponding counter-surfaces, by means of alternating valve 623 integrated into the oscillating motor, only when pressure is applied to working chambers 64*a*, 64*b*. Therefore, a very good seal and thus a high volumetric degree of effectiveness is achieved over the time period of the adjustment, in other words in the state when pressure is applied. In the pressure-free state, the hydraulic press-down force is completely absent, with the advantage of a reduction in friction wear.

In order to avoid external leaks at shaft seals 631 in an operating state with low operating pressure, these are additionally provided with a support element 632. Support element 632 prevents lifting of the sealing edge at high speeds of rotation. To support the sealing effect of seals 631, hydraulic channels 634 are worked into lid 63.

A slide alloy 633 is affixed to lids 63, for axial and radial bearing of the rotor shaft in lids 63 of the stator housing 62, which alloy is unreleasably cast-filled into lids 63. In this way, a thin-walled, vibration-resistant coating is formed, which is suitable for absorbing the stresses that result from shaft bending and mass forces, while simultaneously providing good sliding properties. In the exemplary embodiment, slide alloy 633 is a lead/bronze alloy that combines the high mechanical properties of the base material of lid 63 with the excellent slidability of the alloy components, because of the thin-walled configuration.

In the start-up phase of the vibrator, imbalance masses 311 and 331 are oriented, with regard to imbalance mass 321, in such a manner that the resulting imbalance is equal to zero. Gear wheel 33 is driven by way of shaft 3, which is connected with drive 2, and drives gear wheel 614 of shaft 61, thereby causing oscillating motor 6 that is connected with shaft 61 to rotate. Gear wheel 613 and, in the same manner, gear wheel 31 are driven by way of shaft 61.

Shaft 5, with gear wheel 52 disposed on it in fixed manner, so as to rotate with it, is put into rotation by way of the —synchronously controlled—drive 4. The gear wheel, in turn, engages gear wheel 621 of stator housing 62. Gear wheel 32 of shaft 3 is rotated by way of gear wheel 621 of stator housing 62; the former is mounted on shaft 3, so as to rotate. At the end of the start-up phase, one of the working chambers 64*a*, 64*b* has excess pressure applied to it by way of hydraulic channels 612, regulated by way of an external directional valve, so that gear wheel 621 is rotated relative to rotor shaft 61 and therefore also relative to gear wheels 613, 614, which are connected with rotor shaft 61 so as to rotate with it.

In the same manner, gear wheels 32, 52 that stand in engagement with the gear wheel 621 of stator housing 62 are changed in terms of their rotary position, so that the imbalance masses 321, 521 are brought out of equilibrium with regard to the imbalance masses 311, 331, 511, 531, thereby bringing about a resulting imbalance. The degree of vibration can be adjusted in a stepless manner, by adjusting the degree of rotation of gear wheel 621 with regard to gear wheels 613, 614 of rotor shaft 61.

Once the desired degree of vibration has been reached, multiple-disk brake 65 is mechanically activated by spring force, with hydraulic pressure relief, thereby locking stator housing 62 to rotor shaft 61. After locking, no further regulation of the position of the oscillating motor by way of the hydraulics is required, so that pressure application can now be shut off, relieving stress on the seals. Subsequently, the actual pile-driving process can be carried out.

Since oscillating motor 6 is now only operated in the load-free state of the vibrator, and is relieved of stress due to the locking by means of multiple-disk brake 65 during the pile-driving process, a clearly lesser construction size of the oscillating motor is made possible.

Figure 2:
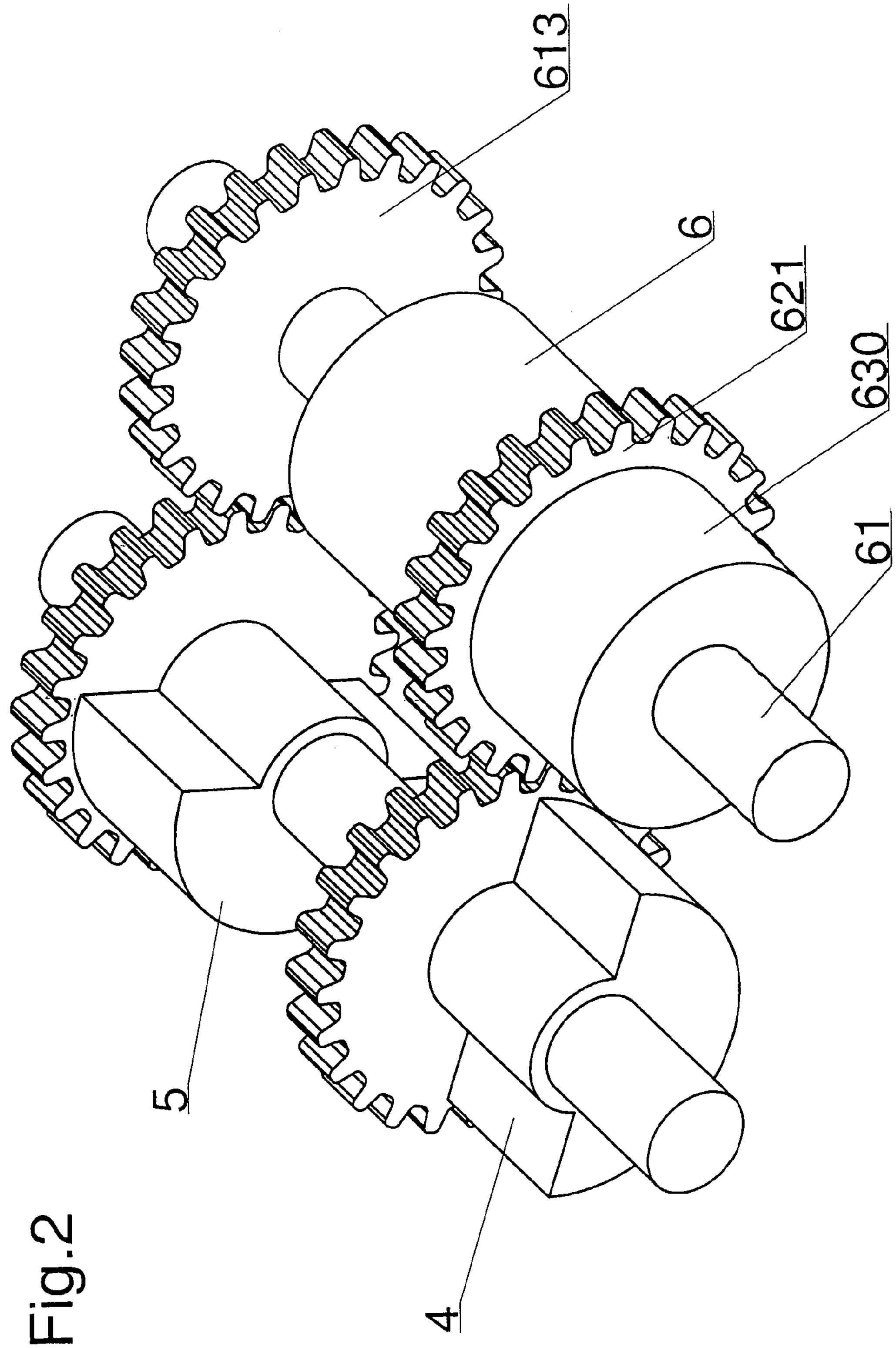
FIG. 2 shows a fundamental representation of an imbalance adjustment indexed to an oscillating motor, having an axle loaded with an imbalance.
Figure 3:
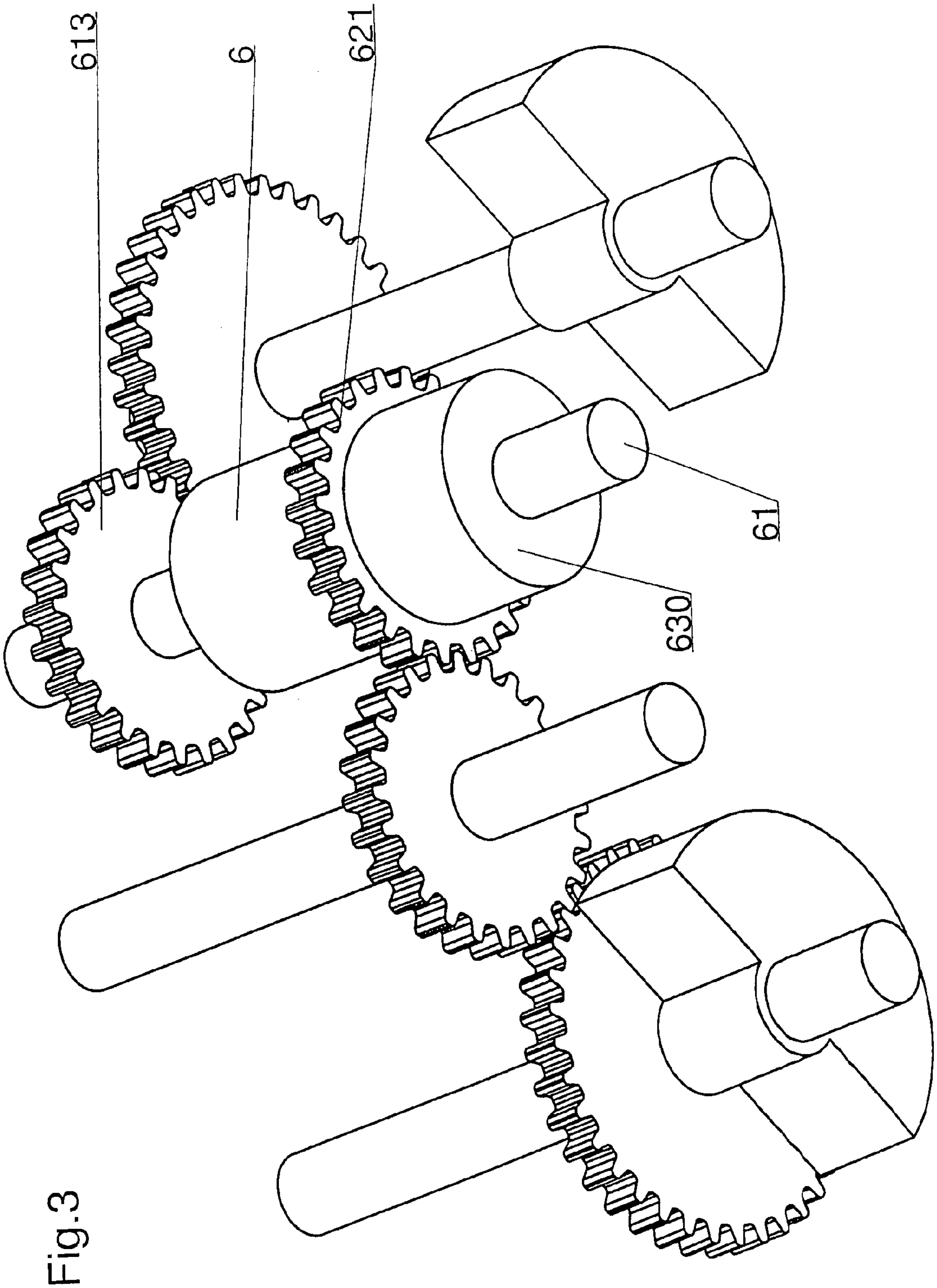
FIG. 3 shows a fundamental representation of an imbalance adjustment indexed to an oscillating motor, having two axles loaded with an imbalance, for adjusting the force direction.
Figure 4:
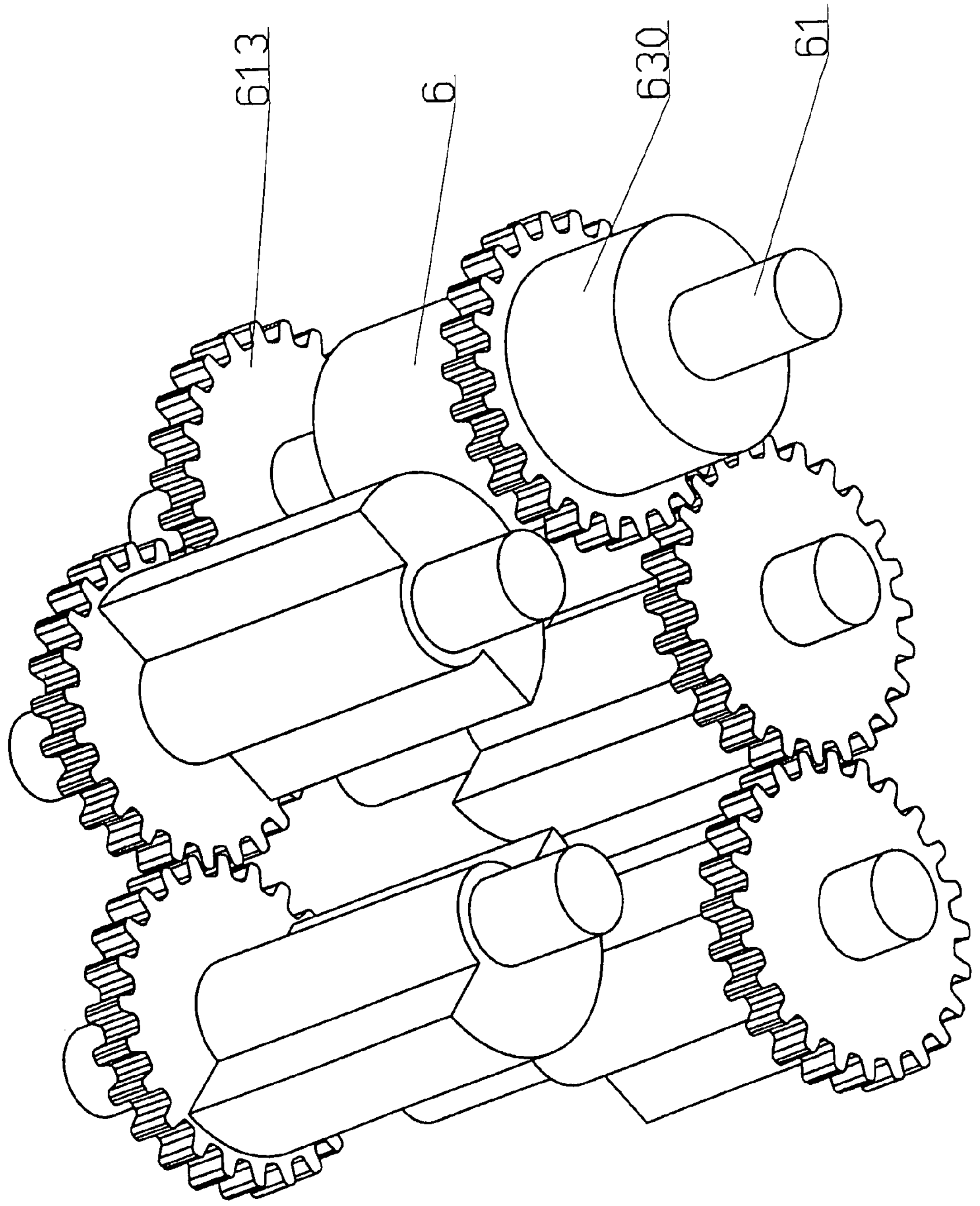
FIG. 4 shows the fundamental representation of an imbalance adjustment indexed to an oscillating motor, with shafts loaded with imbalances, disposed in pairs.

To make the imbalance regulation by means of the rotor oscillating motor, according to the present invention, clear, different shaft and imbalance mass arrangements are shown schematically in FIGS. 2 to 4. Of course, the present invention is not limited to the arrangement shown as an example.

FIG. 3 shows a possibility of adjusting the force direction. In the case of soil compactors such as shaker plates, a movement direction can be achieved in this manner. In this connection, oscillating motor 6 changes the angular position of the imbalances relative to one another, by way of gear wheels 613 and 621.

Accordingly, while only a few embodiments of the present invention have been shown and described, it is obvious that many changes and modifications may be made thereunto without departing from the spirit and scope of the invention.

What is claimed is:

1. A vibration exciter comprising:

at least two axles disposed parallel to one another;

at least two imbalance masses, which are attached to one or more of the axles;

means for adjusting the relative rotary position of the imbalance masses relative to one another, said means comprising at least one rotary hydraulic oscillating motor having a rotor shaft and a stator housing, wherein the rotor shaft is an integral part of one of the axles, wherein the rotary position of the stator housing relative to the rotor shaft is adjustable, and wherein the rotary hydraulic oscillating motor has means for locking the stator housing to the rotor shaft.

2. A vibration exciter according to claim 1, further comprising at least one shaft seal disposed between the rotor shaft and stator housing, said seal being provided with a support element.

3. A vibration exciter according to claim 2, wherein the shaft seal is hydraulically biased.

4. A vibration exciter according to claim 1, wherein the stator housing has at least one closure lid that is at least partially unreleasably coated with a slide alloy, for radial and axial bearing of the rotor shaft.

5. A vibration exciter according to claim 1, wherein the rotor shaft is at least partially unreleasably coated with a slide alloy.

6. A vibration exciter according to claim 1, further comprising a gear wheel disposed on the stator housing, said gear wheel being configured as a stator having at least one stator vane in an inside that faces the rotor shaft.

7. A vibration exciter according to claim 1, wherein the means for locking the stator housing to the rotor shaft is hydraulically activated.

8. A vibration exciter according to claim 1, wherein the means for locking the stator housing to the rotor shaft is formed by a spring-pressure multiple-disk brake.

9. A hydraulic oscillating motor for use in a vibration exciter, comprising:

a rotor shaft;

a stator housing that rotates about the rotor shaft, wherein working chambers are formed between the rotor shaft and stator housing via a stator vane and a rotor vane;

an alternating valve disposed on the stator vane, said valve having control channels which open into said working chambers;

channels disposed on the rotor shaft for supplying media to the working chambers; and means for locking the stator housing relative to the rotor shaft.

10. An oscillating motor according to claim 9, wherein the means for locking is hydraulically activated.

11. An oscillating motor according to claim 9, wherein the means for locking are formed by a spring-pressure, multiple-disk brake.

12. An oscillating motor according to claim 9, further comprising at least one shaft seal disposed between the rotor shaft and stator housing, said seal being provided with a support element.

13. An oscillating motor according to claim 9, further comprising a gear wheel disposed on the stator housing, said gear wheel being configured, on its inside facing the rotor shaft, as a stator having stator vanes.

14. An oscillating motor according to claim 9, wherein the stator housing has at least one closure lid that is at least partially unreleasably cast-filled with a slide alloy, for radial and axial bearing of the stator housing with respect to the rotor shaft.

15. An oscillating motor according to claim 9, wherein the rotor shaft is at least partially unreleasably cast-surrounded with a slide alloy for radial and axial bearing of the stator housing with regard to the rotor shaft.

* * * * *